United States Patent
Teel

[11] 3,782,766
[45] Jan. 1, 1974

[54] DEMOUNTABLE VEHICLE ROPE BARRIER

[76] Inventor: William A. Teel, 901 Fifth St., Sandusky, Ohio 44870

[22] Filed: Feb. 2, 1972

[21] Appl. No.: 222,911

[52] U.S. Cl....... 293/1, 40/129 C, 49/34, 256/1, 280/150 R, 293/62, 293/65, 293/72
[51] Int. Cl..... B60r 19/00, B60r 27/00, E04h 17/00
[58] Field of Search...... 40/129 C; 293/64, 293/65, 66, 67, 72, 1, 62; 49/34; 256/1; 280/150 R

[56] References Cited
UNITED STATES PATENTS

| | | | |
|---|---|---|---|
| 3,408,771 | 11/1968 | Garrett et al. | 49/34 |
| 3,688,440 | 9/1972 | Applegarth et al. | 49/34 |
| 1,465,589 | 8/1923 | Rodgers | 293/72 X |
| 1,535,826 | 4/1925 | Graham | 293/62 X |
| 1,465,590 | 8/1923 | Rodgers | 293/62 |
| 2,190,328 | 2/1940 | Hans | 293/65 |
| 2,175,502 | 10/1939 | Campbell | 293/65 |
| 2,245,848 | 6/1941 | Bagnall | 293/65 |
| 2,146,912 | 2/1939 | Phipps | 293/65 |
| 2,431,108 | 11/1947 | Carleton et al. | 40/129 |
| 2,816,377 | 12/1957 | Hastings | 293/65 X |

Primary Examiner—Robert G. Sheridan
Assistant Examiner—Howard Beltran
Attorney—George S. Baldwin et al.

[57] ABSTRACT

A set of four supports is disclosed for holding a demountable flexible rope barrier in position clamped to the front and rear bumpers of an automobile on display so as to provide a barrier therearound between spectators and the automobile.

1 Claim, 3 Drawing Figures

PATENTED JAN 1 1974

3,782,766

DEMOUNTABLE VEHICLE ROPE BARRIER

BACKGROUND OF THE INVENTION

When expensive automobiles are placed on display in an antique car show, it is desirable to keep spectators from touching or handling any part of the car. A barrier supported on posts placed on the floor about the automobile are likely to be moved out of position or even knocked over so that they strike and damage some part of the car. The present invention is to replace such previously known barriers.

The object of the present invention is to provide a set of four rope supports adapted to be clamped to the automobile bumpers, one near the outer end of each of the front and back bumpers, after which the flexible rope can be strung from the upper and outer ends of the supports at a sufficient distance away from the car so as to keep spectatots from touching the car easily. Two of the rope supports extend upwardly and outwardly from an associated bumper toward the right and the other two supports slope upwardly and outwardly from the associated bumpers toward the left.

The structure and the advantages thereof will be clearly understood from the accompanying specification and drawings and the essential features thereof will be set forth in the appended claims.

In the drawings,

FIG. 2 is an elevational view, enlarged, of the rope support shown at the front right-hand side of FIG. 1 taken generally along the line 2—2 of FIG. 1; while

Figure 2:
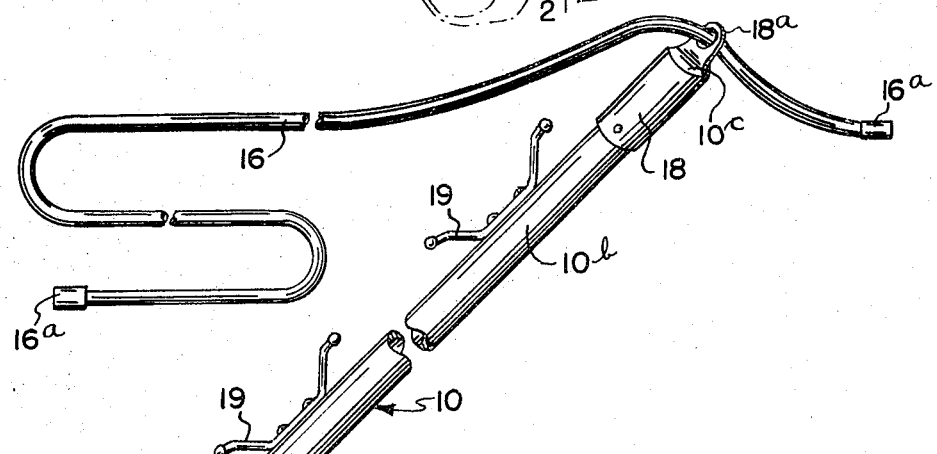
Figure 2:
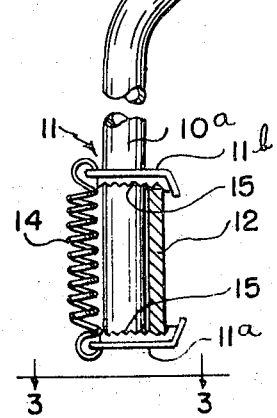

A set of rope supports according to this invention comprises one which is exactly like that shown in FIG. 2 while the other three are similar except that they do not have the spaced cleats for storing the rope when not in use. As mentioned previously, two of the supports extend toward the right from a clamping position on a bumper and the other two extend toward the left. Each of the supports is rod-like and preferably made of hollow tubular members. Each of the supports 10 has a portion 10a generally vertical when in use and having an integral bent portion 10b extending from the upper end of the vertical portion outwardly to a distal end 10c which in use extends laterally outside the widest dimension of the displayed automobile.

Figure 3:
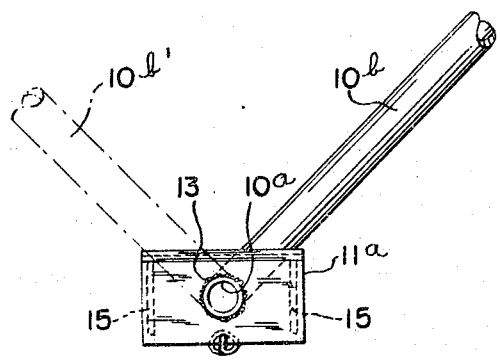
FIG. 3 is a bottom plan view taken from the position of the line 3—3 of FIG. 2 and indicating in full lines a right-hand extending support and in dot-dash lines a left-hand extending support broken away.

A clamp 11 is provided at the lower end of each of the supports adapted to be quickly clamped on the bumper 12 of an automobile. Each clamp comprises a lower jaw 11a and an upper movable jaw 11b. Each jaw 11a is preferably welded at 13 so as to keep the support from twisting relative to its associated clamp. Two of the supports are shown in the position 10b of FIG. 3 while two of the supports are fixed in the position 10b' of the same Figure. The upper jaw 11b of each clamp is slidable upon the vertical portion 10a of the rope support and the preferred means for holding the clamp jaws in the clamping position is a helical tension spring 14 which is connected between a pair of the jaws 11a and 11b and is arranged to be held in tension when the jaws are clamped upon a bumper 12. It is obvious that the upper jaw may be moved to a wider position than that shown in FIG. 2, then placed over the associated bumper 12 and released to a clamping position. Preferably, but not necessarily, serrated jaws may be provided as indicated at 15, secured to the members 11a and 11b to grip the automobile bumper more securely.

A flexible rope 16 is provided of sufficient length preferably to go around the four supports when in position on a car and to be tied together at 17 at or near one of the corner supports. This rope may be either metallic or non-metallic. The ends of the rope are suitably bound as shown at 16a to prevent unraveling. Preferably, means is provided at the outer or distal end of each of the supports 10 to make it easy to fasten a rope there. As shown in the drawings, an eye end 18 is provided at the distal end of each support having a through opening 18a through which the rope 16 may be passed.

Preferably, as shown in FIG. 2, a pair of spaced cleats 19 is provided on one of the supports about which the rope 16 may be secured by passing the same back and forth between the cleats in a known manner to store the rope when not in use.

Figure 1:
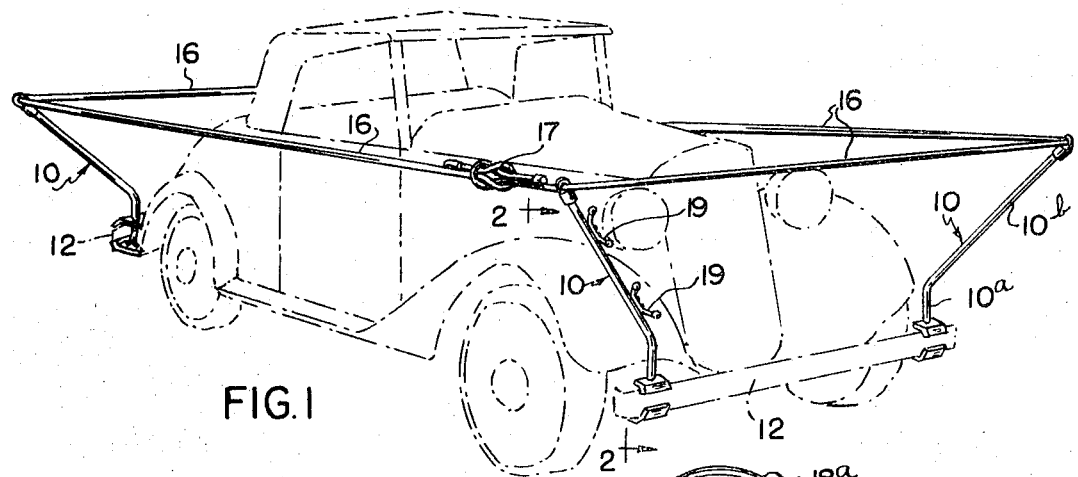
FIG. 1 shows the rope barrier in perspective and in position about a display automobile which is shown in dot-dash lines.

The use of this invention should now be readily understood. The rope 16 is removed from the cleats 19 and two righthand extending rope supports 10 are secured to the right-hand ends of the front and rear bumpers by spreading the clamp jaws 11a and 11b and allowing the spring 14 to clamp them tightly on the bumper. Likewise, two left-hand extending supports 10 are fastened to the left-hand ends of the front and rear bumpers. The rope 16 is then passed through the openings 18a and secured together by a knot or otherwise to provide a barrier extending completely around the car at approximately the height of the hood as seen in FIG. 1 and supported in position by the car itself. It will be noted that the rod-like supports 10 are the sole means for holding the rope 16 in position to keep spectators away from the displayed automobile.

What is claimed is:

1. A demountable rope barrier structure for the display of an automobile which has front and rear horizontally extending bumpers, consisting of four rod-like rope supports, each of said supports having a portion generally vertical in use and having an integral bent portion extending from the upper end of said vertical portion upwardly and outwardly to a distal end at approximately the height of the hood of the automobile, in use said ends extending laterally outside the widest and longest dimension of a displayed automobile, a clamp comprising a pair of vertically spaced clamp jaws on each said vertical portion, the lower of said clamp jaws being fixed to its associated support, the upper of said clamp jaws being slidable on said vertical portion between a first position spacing said clamp jaws wider than the vertical dimension of the associated bumper of the display automobile and a second position gripping said bumper between said clamp jaws, and means for holding said clamp jaws in said second position, two of said supports being fixed to their associated clamps to extend from the associated bumpers toward the right, and two other of said supports being fixed to their associated clamps to extend from the associated bumpers toward the left, said means for holding the clamp jaws in said second position comprising a tension spring secured between each pair of associated upper and lower clamp jaws and held in tension when said jaws are in said second position, whereby four of said supports may be clamped, two near opposite ends of the front and of the rear bumpers and a flexible rope may be strung between the distal end of said supports extending entirely around the automobile.

* * * * *